Patented Mar. 5, 1935

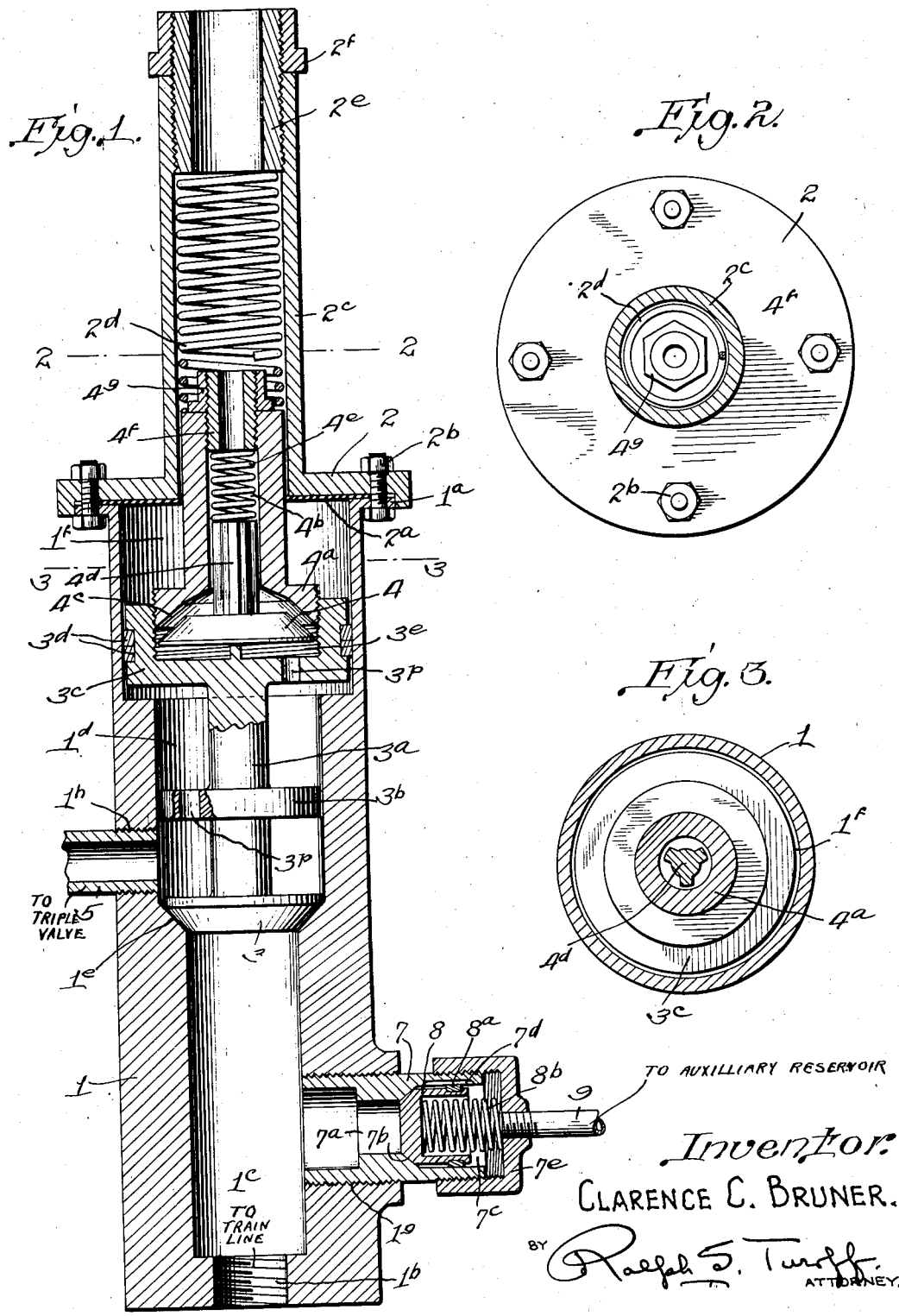

1,993,239

UNITED STATES PATENT OFFICE 1,993,239

AIR BRAKE SAFETY DEVICE

Clarence C. Bruner, Phippsburg, Colo.

Application September 5, 1930, Serial No. 480,002
Renewed January 21, 1935

3 Claims. (Cl. 303—77)

This invention relates to improvements in air brakes, and more particularly to a safety retaining device or valve especially designed for use in connection with air brake systems commonly employed on railroads.

Such systems are contemplated as employ a single train air line, each car being provided with a brake cylinder, an auxiliary air reservoir, a triple valve and a retainer; the triple valve being operated by reductions in train-line pressure for properly supplying air from the auxiliary reservoir of each car to the brake cylinder thereof.

During the operation of railroad trains particularly down relatively steep or long grades, it is necessary that continual and successive reduction in pressure be made in the train-line in order that a proper air pressure within the brake cylinders may be maintained, from the auxiliary reservoirs, to compensate for leakage therefrom. Through these successive reductions the pressure in the auxiliary reservoirs becomes so far depleted within a relatively short time as to become ineffective. In like manner when a full service application is made, any further leakage of air would draw from or decrease pressure in both the auxiliary reservoirs and brake cylinders, thus decreasing any braking pressure.

It is therefore essential to provide some means for restoring proper pressures within both the brake cylinders and the auxiliary reservoirs, either when the pressure in the said reservoirs has been reduced to below a certain quantity or to a danger point, or when a full service application of brakes be made.

It is accordingly a major purpose of the present invention to provide in air brake systems of the class set forth, a novel safety device for insuring the restoring or replenishing of air pressure within the auxiliary reservoirs when the same shall have been reduced to below a danger point, and to recharge the train-line when so required without releasing of the brake-cylinder pressure.

It is a further object of the present invention to provide in air brake systems of the class set forth, a novel retaining device or valve which will insure the maintaining of any set or desired pressure within the brake cylinders, and the constant maintaining of proper and adequate pressure within the auxiliary reservoirs. A still further object of the invention is to provide a novel safety retaining valve of the class set forth whereby a greater flexibility of range of brake cylinder settings may be had to compensate either for the continually increasing weights of railroad cars, particularly freight cars, and the consequent variation of train-weight with the cars either loaded or empty. Further objects of the invention will be hereinafter more fully set forth.

The accompanying drawing illustrates one practical retaining device of the class set forth, constructed in accordance with the present invention, which will be described in detail to enable others to understand and use the same, but the invention is not considered restricted to the specific construction shown in the drawing, and reference is therefore had to the claims for summaries of the essentials of the invention and of the novel features of construction and of the novel combinations of parts for all of which protection is desired.

In the drawing:

Figure 1 is a central vertical sectional view taken through the entire novel retaining device, illustrating the operative parts thereof in position when a sufficient reduction is made to maintain a set braking pressure.

Figure 2 is a detail horizontal sectional view taken on the line 2—2 of Figure 1.

Figure 3 is a detail horizontal sectional view taken on the line 3—3 of Figure 1.

As shown in the drawing, the novel retaining valve which may be of any desired size and conformation, comprises a substantially tubular casing or housing 1, provided at its upper extremity with an annular shoulder adapted for engagement with a cover or cylinder head 2. Preferably a suitable gasket 2$^a$ is provided between the shoulder 1$^a$ and the head 2 and suitable apertures are provided for the passage of securing devices of any desired character such as bolts or the like 2$^b$.

The casing 1 is provided at its lower extremity with a threaded aperture 1$^b$, for engagement or connection to the train-line (not shown); the casing further including an interior bore 1$^c$ providing communication through the aforementioned aperture to the said train-line.

The bore 1$^c$ is vertically disposed and communicates at its upper extremity with an enlarged bore 1$^d$; an angularly disposed conical valve seat 1$^e$ separating the two bores. The bore 1$^d$ in turn communicates at its upper extremity with a still further enlarged bore 1$^f$ extending to the top of the casing and for a purpose to be hereinafter more fully described. A threaded aperture 1$^g$ is provided extending through a side wall of the casing into the bore $1^c$, thus providing communication therebetween and an auxiliary reservoir (not shown); the casing being further provided with a second threaded aperture $1^h$ also horizontally disposed through a side wall thereof to communicate with the bore $1^d$ at a point immediately above the valve seat $1^e$ to provide communication between this portion of the bore of the casing and the usual train pipe connection of the triple valve (also not shown).

A conical valve 3, adapted to seat upon the valve seat $1^e$ is disposed within the bore $1^d$ of the casing, the said valve including a stem $3^a$ having a guide portion $3^b$ thereon adapted to guide the vertical reciprocation of the said valve. Preferably the valve stem $3^a$ has integrally formed on the upper extremity thereof a piston $3^c$ provided with the usual piston rings $3^d$ adapted to engage against the walls of the bore or cylinder $1^f$. The piston $3^c$ is provided on the upper surface thereof with a recess $3^e$ adapted for the reception of a relief valve 4 of conical conformation; the recess $3^e$ being threaded for engagement with the relief valve body $4^a$. Preferably this relief valve body includes an interior bore $4^b$, and is provided at its lower extremity with a conical valve seat $4^c$ against which the valve 4 is adapted to seat. It will be noted that both the valve guide $3^b$ and the bottom wall of the piston $3^c$ are provided with an aperture or port $3^p$ to permit of the passage of air from the train-line so as to close the valve 4 upon the opening of the valve 3, for a purpose to be hereinafter more fully described.

The relief valve 4 further includes a winged stem portion $4^d$ adapted to fit freely within the bore $4^b$. Any desired means might be provided to impart a proper tension to the valve 4. Preferably such means are resilient and include a coil spring $4^e$ positioned within the bore $4^b$ and adapted to bear against the top of the valve stem.

The bore $4^b$ is threaded at its upper extremity for engagement with a similarly externally threaded adjusting screw $4^f$ for governing or varying the spring pressure against the valve 4. A lock nut $4^g$ might be provided for insuring the locking of the screw $4^f$ for any desired adjusted position or setting of the valve.

Preferably the cylinder head 2 includes a reduced vertically disposed tubular portion $2^c$ adapted to surround the upper portion of the relief valve body, and further adapted to house adjustable means for controlling the pressure or tension upon the main valve 3. Such means might well be similar to the above described means for adjusting the relief valve pressure, including a coil spring or the like $2^d$ adapted to bear against the upper surface of the relief valve housing, and adjusting screw $2^e$ being threaded within the upper extremity of the tubular portion $2^c$ of the cylinder head, and adapted to engage against the spring $2^d$,—the said screw being provided with a lock nut $2^f$ for maintaining the same locked in any desired set or adjusted position.

The connection 5 between the casing 1 and the triple valve is of any desired convenient construction as is known in this art, and is accordingly believed to require no particular discussion here.

A suitable connection is provided between the casing 1 and the auxiliary reservoir. Preferably such connection includes a threaded nipple 7 adapted for engagement with the threaded aperture $1^g$ of the casing.

The nipple 7 is provided with an interior bore $7^a$ including a conical valve seat $7^b$ upon which a suitable check valve 8 is adapted to seat. Preferably the check valve 8 may include a piston ring $8^a$ adapted for engagement with an enlarged portion $7^c$ of the bore $7^a$; a groove or the like $7^d$ being provided to permit the passage of air beyond the said ring. Any desired resilient means might be provided to insure proper tension upon the check valve 8. Preferably one form of such means includes a coil spring or the like $8^b$ adapted to bear against the check valve and maintain the same seated, the pressure of the said spring being regulated by a removable cap $7^e$ adapted to be threaded upon the extremity of the nipple 7.

The cap is provided with a centrally located threaded aperture for engagement with a suitable pipe-line 9 leading to the auxiliary reservoir (not shown).

In the operation of the herein described safety device, the several valve adjusting means are properly set in the assembly thereof at the required tensions at which it is desired that they operate.

The following example of operation is given for the purpose of explanation only and it is to be understood that all adjustments may be changed to meet requirements.

With brake system of the train at atmospheric pressure, spring $2^d$ set at 90 pounds, spring $4^e$ set at 50 pounds, and spring $8^b$ set at 50 pounds, the train line feed valve set at 70 pounds, the automatic brake valve is placed in full release position to charge said system.

When the train line pressure exceeds 50 pounds, spring $8^b$ will open and permit a small amount of air to pass to the auxiliary reservoir and will close when the auxiliary reservoir is charged. When the train line pressure reaches 90 pounds, spring $2^d$ will be compressed and valve 3 will open and permit free communication between the train line and the triple valve through $1^h$. Air passing through port $3^p$ will close valve 4 by compressing spring $4^e$, the flow through said port being relatively rapid. The train line and auxiliary reservoirs may then be charged, operated and tested in the regular manner.

In ordinary service operations my device does not operate for the following reason: The large area of piston $3^c$ enables 50 pounds of air pressure to hold spring $2^d$ compressed.

The only time the device is intended to operate is when the train line pressure is drawn down to a danger point, 50 pounds for example. This condition would arise while descending heavy grades as the result of successive brake applications. At this point spring $4^e$ opens valve 4 and spring $2^d$ closes valve 3. It will now require 90 pounds of air pressure on valve 3 to release the brakes in full. However air pressure may be applied to the brake cylinders through the auxiliary reservoirs and triple valves through valve 8 and pipe 9 as needed, by increasing train line pressure.

It is believed that the above explanation shows how the device will retain, replenish or release pressure as desired.

The pressure that may be retained through the herein described safety device is equal to the difference between the train line pressure and the adjusted pressure of the check valve spring $8^b$. The check valve 8 will close when the pressure of the spring $8^b$ plus the brake cylinder pressure—which is operated through the auxiliary reservoir—exceeds the train-line pressure, accordingly a predetermined pressure may be maintained until the brake is released in full. This releasing is accomplished and the operative parts of the retaining valve returned to normal running position by increasing the train line pressure to a point exceeding the pressure of the adjusted spring $2^d$ when the valve 3 will open.

It is to be understood that wherever in the foregoing description the terms "air" or "air pressure" have been employed, that the present invention will operate fully as satisfactorily with any other desire type of fluid pressure.

There has thus been described a novel safety retaining device adapted for use in connection with air brake systems of the class set forth, which will insure the maintaining of any desired set pressure within the brake cylinders and the constant maintaining of proper and adequate pressure within the auxiliary reservoirs, and which will further insure the recharging of the train-line when so required without the releasing of the brake cylinder pressure.

The invention having thus been described what is claimed is:—

1. In an air brake system, the combination with a train-line, auxiliary reservoir, triple valve and brake cylinder, of a retaining valve comprising a casing provided with a vertical bore, a valve seat in said bore, an adjustable vertically disposed main valve adapted to seat thereon and operable by train-line pressure, a piston carried on the upper extremity of the said valve, an adjustable relief valve housed in the said piston, means for supplying fluid pressure upon the relief valve to maintain the same closed when the main valve is opened and means for opening said relief valve upon reduction of the fluid pressure.

2. In an air brake system, the combination with a train-line, auxiliary reservoir, triple valve and brake cylinder, of a retaining valve comprising a casing having a vertical bore therein, a valve seat in said bore, an adjustable vertically disposed main valve adapted to seat thereon and operable by train-line pressure, a piston carried on the upper extremity of the said valve and engaging with an enlarged portion of the said bore, an adjustable relief valve housed in the said piston, means for varying the tensions of both the main valve and the relief valve, means for supplying fluid pressure upon the relief valve to maintain the same closed when the main valve is opened, means for opening the relief valve upon reduction of the fluid pressure, a connection between the casing and the auxiliary reservoir below the main valve seat, and an adjustable check valve in said connection.

3. In a safety retaining device of the class set forth, in combination, a casing having an interior bore therein, a valve seat in said bore, a vertically disposed valve adapted to seat thereon the said valve including a piston on its upper extremity engaging within an enlarged portion of the said bore, a recess in the head of said piston, a housing engaging in the recess the said housing including a valve seat, a relief valve adapted for engagement with said seat, means for adjusting the tension of both the relief valve and the main valve, a connection above the main valve between the casing and the triple valve, connection below the main valve between the casing and the auxiliary reservoir, an adjustable check valve in said last mentioned connection, means for supplying fluid pressure to the casing whereby to open the main valve and supply pressure to the triple valve, means for supplying pressure to the relief valve to maintain the same closed when the main valve is opened said means comprising a port in the aforementioned piston, and means for opening the relief valve and closing the main valve upon reduction of the fluid pressure.

CLARENCE C. BRUNER.